(12) United States Patent
Chatterjee (10) Patent No.: US 11,350,391 B2
(45) Date of Patent: May 31, 2022

(54) DETERMINATION OF NUMBER OF PHYSICAL UPLINK CONTROL CHANNEL REPETITIONS FOR MACHINE TYPE COMMUNICATIONS

(71) Applicant: APPLE INC., Cupertino, CA (US)

(72) Inventor: Debdeep Chatterjee, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/749,757

(22) PCT Filed: Mar. 31, 2016

(86) PCT No.: PCT/US2016/025265
§ 371 (c)(1),
(2) Date: Feb. 1, 2018

(87) PCT Pub. No.: WO2017/052688
PCT Pub. Date: Mar. 30, 2017

(65) Prior Publication Data
US 2019/0182824 A1    Jun. 13, 2019

Related U.S. Application Data

(60) Provisional application No. 62/232,385, filed on Sep. 24, 2015.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1861* (2013.01); *H04L 5/0053* (2013.01); *H04W 4/70* (2018.02); *H04W 74/0833* (2013.01)

(58) Field of Classification Search
CPC ......... H04W 72/0413; H04W 74/0833; H04W 4/70; H04L 1/1861
See application file for complete search history.

(56) References Cited

U.S. PATENT DOCUMENTS

2016/0192376 A1* 6/2016 Lee .................. H04W 48/20
370/252
2016/0330633 A1* 11/2016 You ................... H04J 11/0079
(Continued)

FOREIGN PATENT DOCUMENTS

WO    2017/052688 A1    3/2017

OTHER PUBLICATIONS

Mediatek Inc, "Discussion on PUCCH transmission for Rel-13 MTC," Discussion, Apr. 11, 2015, 4 pages, R1-152115, 3GPP, Belgrade.*
(Continued)

*Primary Examiner* — Charles C Jiang
*Assistant Examiner* — Ryan C Kavleski
(74) *Attorney, Agent, or Firm* — Fay Kaplun & Marcin, LLP (57) ABSTRACT

Briefly, in accordance with one or more embodiments, an apparatus of a machine-type communication (MTC) user equipment (UE) comprises baseband processing circuitry to establish a radio resource control (RRC) connection with an evolved Node B (eNB), and process a message from the eNB indicating a number of repetitions of physical uplink control channel (PUCCH) transmissions to be used over multiple uplink subframes after the radio resource control connection is established.

18 Claims, 6 Drawing Sheets

(51) Int. Cl.
*H04W 4/70* (2018.01)
*H04L 1/18* (2006.01)
*H04W 74/08* (2009.01)

(56) References Cited

U.S. PATENT DOCUMENTS

2016/0381712 A1* 12/2016 Yang .................... H04W 74/08
                                                      370/329
2017/0135134 A1*  5/2017 Rune ................ H04W 36/0005
2017/0303248 A1* 10/2017 Chatterjee ............... H04L 1/189
2018/0097599 A1*  4/2018 Lee .................... H04W 72/042

OTHER PUBLICATIONS

Mediatek Inc, "Discussion on PUCCH transmission for Rel-MTC," Discussion Apr. 11, 2015, 4 pages, R1-152115, 3GPP, Belgrade.*

International Preliminary Report on Patentability received for International Application No. PCT/US2016/025265, dated Apr. 5, 2018, 7 pages.

Notice of Allowance received for European Patent Application No. 16716759.2, dated Feb. 18, 2019, 37 pages.

International Search Report and Written Opinion received for International Application No. PCT/US2016/025265, dated Jun. 20, 2016, 9 pages.

Mediatek Inc, "Discussion on PUCCH functionality for Rel-13 MTC," Discussion, Apr. 19, 2015, 2 pages, R1-152114, 3GPP, Belgrade.

Intention to Grant received for European Patent Application No. 16716759.2 dated Jul. 2, 2019, 37 pages.

* cited by examiner

# DETERMINATION OF NUMBER OF PHYSICAL UPLINK CONTROL CHANNEL REPETITIONS FOR MACHINE TYPE COMMUNICATIONS

CROSS-REFERENCE TO RELATED APPLICATIONS

The present application is the National Stage Application of International Application No. PCT/US2016/025265 filed Mar. 31, 2016, titled DETERMINATION OF NUMBER OF PHYSICAL UPLINK CONTROL CHANNEL REPETITIONS FOR MACHINE TYPE COMMUNICATIONS, which in turn claims the benefit of U.S. Application No. 62/232,385 (P90108Z) filed Sep. 24, 2015. Said Application No. PCT/US2016/025265 and said Application No. 62/232,385 are hereby incorporated herein by reference in heir entireties.

BACKGROUND

Machine-Type Communication (MTC) is a promising and emerging technology to enable a ubiquitous computing environment towards the concept of Internet of Things (IoT). Potential MTC based applications include smart metering, healthcare monitoring, remote security surveillance, intelligent transportation system, and so on. These services and applications stimulate the design and development of a new type of MTC device to be seamlessly integrated into current and next generation mobile broadband networks such as Long Term Evolution (LTE) and LTE-Advanced (LTE-A).

Existing mobile broadband networks were designed to optimize performance mainly for human type of communications and thus are not designed or optimized to meet MTC related requirements. MTC specific design are being studied by Third Generation Partnership Project (3GPP) Radio Access Network (RAN) working groups (WGs) for specification support in Release 12 of the LTE specifications, wherein the focus is on lower device cost, enhanced coverage and reduced power consumption.

In order to achieve reduced cost and power consumption, it may be beneficial to further reduce the transmission bandwidth for MTC system to 1.4 megahertz (MHz) which is the minimum bandwidth of existing LTE systems. In this case, the transmission bandwidth for both control and data channels can be reduced to 1.4 MHz. In general, it is envisioned that a larger number of MTC devices will be deployed for specific services within one cell in the near future. When such a massive number of MTC devices attempt to access and communicate with the network, multiple MTC regions with 1.4 MHz bandwidth may be allocated by the evolved Node B (eNB).

In order to provide enhanced coverage support for MTC user equipment (UE) devices, it is expected that physical uplink control channel (PUCCH) transmissions on the uplink (UL) carrying hybrid automatic repeat request (HARQ) acknowledgement (ACK) feedback in response to downlink (DL) transmissions on the DL shared channel or scheduling request (SR) may involve being transmitted with multiple repetitions.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
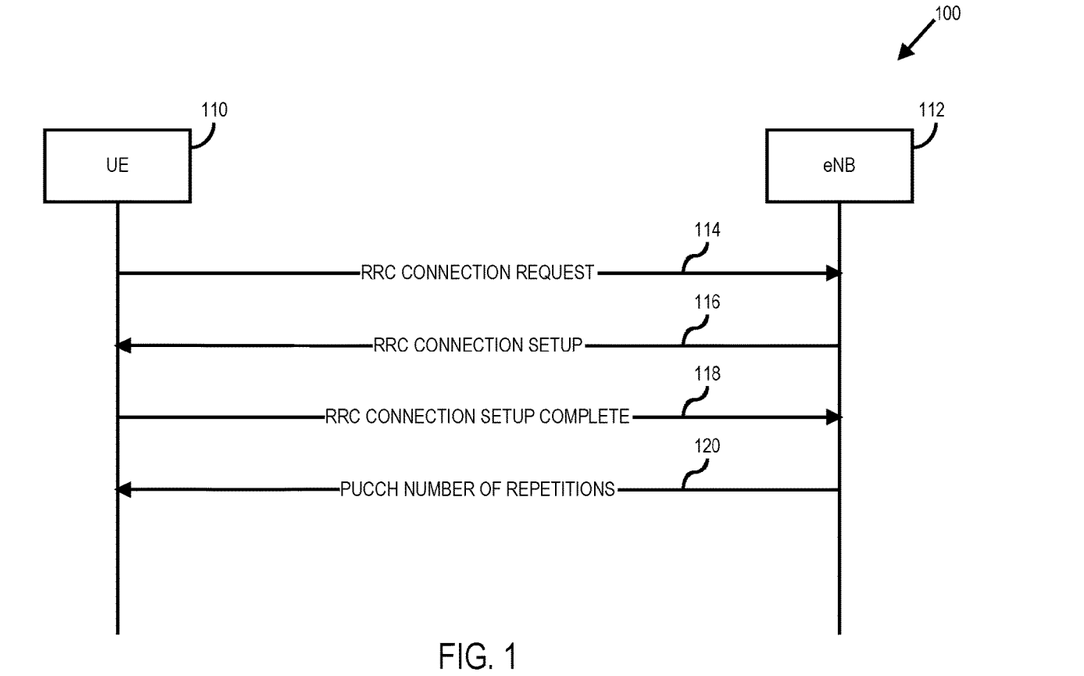
FIG. 1 is a diagram of an network in which a radio resource control (RRC) connection is performed in which the number of physical uplink control channel (PUCCH) repetitions is indicated in accordance with one or more embodiments.

Referring now to FIG. 1, a diagram of a network in which a radio resource control (RRC) connection is performed in which the number of physical uplink control channel (PUCCH) repetitions is indicated in accordance with one or more embodiments will be discussed. As shown in FIG. 1, network 100 may include a user equipment (UE) 110 and an evolved Node B (eNB) 112. In one or more embodiments, UE 110 may comprise a machine-type communication (MTC) device wherein network 100 may operate in compliance with a Third Generation Partnership Project (3GPP) standard. In one or more embodiments, the link between UE 110 as an MTC type device and eNB 112 may have a bandwidth of about 1.4 megahertz (MHz). In order to provide enhanced coverage support for MTC UE 110, physical uplink control channel (PUCCH) transmissions on the uplink (UL) may carry hybrid automatic repeat request (HARQ) acknowledgment (ACK) feedback in response to downlink (DL) transmissions on the DL shared channel or in a scheduling request (SR) may be transmitted with multiple repetitions. In accordance with one or more embodiments discussed herein, UE 110 determines the number of repetitions to use for PUCCH transmissions. In some embodiments, UE 110 sends an RRC connection request to eNB 112 at operation 114. In response, eNB 112 sends the RRC connection setup to UE 110 at operation 116, and then UE 110 sends an RRC connection setup complete message to eNB 112 at operation 118. After RRC setup is complete and UE 110 is in an RRC connected mode, eNB 112 may determine the number of repetitions for PUCCH transmissions and then transmit the number of PUCCH repetitions to UE 110 at operation 120.

Figure 2:
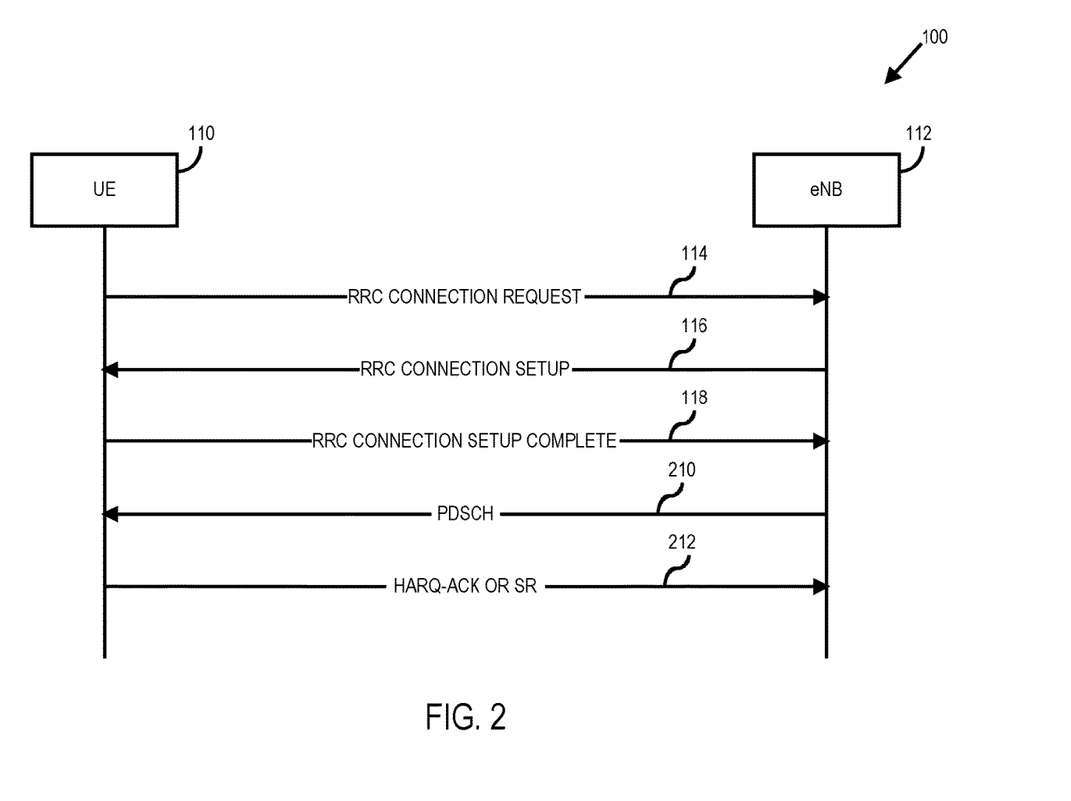
FIG. 2 is a diagram of the network of FIG. 1 in which the number of PUCCH repetitions for hybrid automatic repeat request (HARQ) acknowledgment (ACK) feedback or a scheduling request (SR) in response to a physical downlink shared channel (PDSCH) transmission in accordance with one or more embodiments.

Referring now to FIG. 2, a diagram of the network of FIG. 1 in which the number of PUCCH repetitions for hybrid automatic repeat request (HARQ) acknowledgment (ACK) feedback or a scheduling request (SR) in response to a physical downlink shared channel (PDSCH) transmission in accordance with one or more embodiments will be discussed. After establishment of the radio resource control (RRC) connection via operation 114, operation 116, and operation 118, user equipment (UE) 110 utilizes a number of PUCCH repetitions when the PUCCH carries HARQ-ACK feedback or SR transmissions at operation 212 in response to PDSCH at operation 210. In such an arrangement, UE 110 already may be in an RRC connection (RRC_CONNECTED) state with the RRC connection being established and maintained between eNB 112 and UE 110. In one embodiment, it is possible for eNB 112 to decide on the number of PUCCH repetitions for UE 110 to use based on the observed radio conditions for UE 110 and, accordingly, eNB 112 may indicate the number of repetitions to be used for transmission of HARQ-ACK feedback via dedicated RRC signaling. In another embodiment, UE 110 may decode the downlink control information (DCI) with the DL assignment but may not successfully decode the physical downlink shared channel (PDSCH) at operation 210 carrying the RRC message. In this case, UE 110 may not be able to know the number of repetitions to use to transmit the negative acknowledgment (NACK) message using the physical uplink control channel (PUCCH) to indicate failed reception of the PDSCH. As a result, UE 110 utilizes the number of repetitions that it used for the most recent PUCCH transmission based on the latest RRC configuration received from eNB 112. Furthermore, eNB 112 may assume that until reception of an acknowledgement (ACK) message in response to the PDSCH transmission at operation 210 carrying the RRC configuration message, UE 110 transmits the PUCCH with a number of repetitions that it used for the most recent PUCCH transmission, thereby avoiding any mismatch between the PUCCH resources assumed by eNB 112 to be used by UE 110 and those that are actually used.

In one or more alternative embodiments, as an alternative to the option of using dedicated RRC signaling, the number of repetitions for PUCCH for HARQ-ACK feedback may be indicated by eNB 112 via Layer 1 signaling and carried in the DCI indicating the DL assignment at the expense of a larger DCI size. In order to keep the DCI size small for UEs 110 in enhanced coverage, a set of coverage enhancement (CE) levels with the corresponding number of repetitions may be defined either in a cell specific manner using MTC system information block (SIB) signaling or using dedicated RRC signaling. It should be noted that a CE level may be utilized to imply a coarse coverage enhancement level or class for UE 110 that may map to a different repetition number used for transmitting and/or receiving a particular physical channel. In one example, two bits in the DCI may be utilized to indicate the CE level, and thereby the number of repetitions for PUCCH transmissions to UE 110. For scheduling request (SR) transmissions, the number of PUCCH repetitions carrying SR may be indicated via the same dedicated RRC signaling that is used to transmit the SR resource configuration to UE 110.

Figure 3:
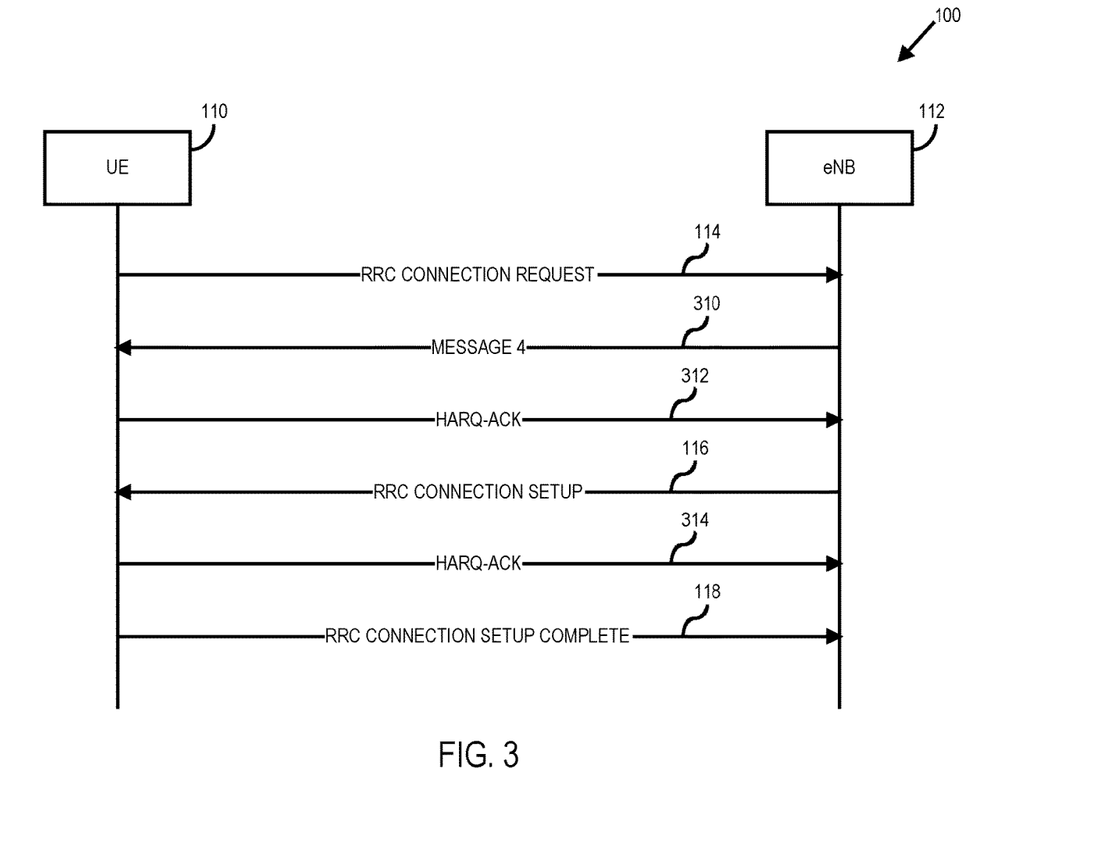
FIG. 3 is a diagram of the network of FIG. 1 in which the number of PUCCH repetitions for hybrid automatic repeat request (HARQ) acknowledgment (ACK) feedback in response to a contention resolution message (Message 4) in accordance with one or more embodiments.

Referring now to FIG. 3, a diagram of the network of FIG. 1 in which the number of PUCCH repetitions for hybrid automatic repeat request (HARQ) acknowledgment (ACK) feedback in response to a contention resolution message (Message 4) in accordance with one or more embodiments will be discussed. The number of PUCCH repetitions for HARQ-ACK feedback in response to the transmission of Message 4 may be determined. As part of the Random Access (RA) procedure, Message 4 at operation 310 is the first unicast PDSCH transmission to UE 110 for which UE 110 is expected to transmit HARQ-ACK feedback at operation 312. After receipt of RRC Connection Setup message at operation 116, UE 110 may transmit another HARQ-ACK message at 314, followed by an RRC Connection Setup Complete message at operation 118. While the RRC Connection Setup message at operation 116 may be transmitted as part of Message 4, this is not necessarily always the case. In some situations, Message 4 may convey the contention resolution information which is subsequently followed by an RRC configuration message. In either case, for the HARQ-ACK transmission on PUCCH in response to Message 4, eNB 112 may determine the number of repetitions to use for PUCCH. In one embodiment, eNB 112 may signal the number of PUCCH repetitions using the DCI carried by the MTC PDCCH (M-PDCCH) that is transmitted in a Common Search Space, which also may be referred to as non-UE-specific Search Space or Group Search Space, that may be utilized to schedule the PDSCH carrying Message 4. Similar to the alternative option of using Layer 1 signaling described for the case after RRC Connection establishment as discussed above, the DCI may indicate using a limited number of bits the CE level that maps to a number of repetitions that is configured via MTC SIB or may directly indicate the number of repetitions from a set of repetition values configured via MTC SIB signaling.

In a further embodiment, as another alternative to avoid increase in the DCI size for explicit indication of the PUCCH repetition level, a mapping between the CE level that can be known from the PRACH repetition level, or a mapping between number of repetitions used for Message 3 transmission, and the number of repetitions for PUCCH carrying HARQ-ACK feedback in response to Message 4 transmission may be defined. In such an arrangement, PUCCH transmission with HARQ-ACK at operation 312 in response to Message 4 transmission at operation 310 may be defined with the exact configuration of the number of repetitions signaled via MTC SIB. Consequently, eNB 112 determines the number of repetitions for the PUCCH transmission to convey the HARQ-ACK feedback in response to the Message 4 transmission at operation 310 using this defined mapping. Furthermore, a combination of the two approaches wherein only very few bits, for example 1 bit in the DCI scheduling Message 4, may be utilized to indicate the repetition number for PUCCH out of two possible values that are mapped from the Message 3 repetition number or CE level.

In the event that the dedicated RRC message with the configuration of the number of PUCCH repetitions is conveyed in a subsequent dedicated RRC message, UE 110 may utilize the same repetition number for PUCCH to convey the HARQ-ACK feedback in response to any unicast PDSCH transmissions as it used for transmitting HARQ-ACK feedback in response to Message 4 transmission, until a valid RRC configuration with the PUCCH repetition number is received from eNB 112. It should be noted that the number of repetitions for Message 3 transmission either may be indicated explicitly via the Message 2 Random Access Response message or based on a mapping defined between the repetition number used for the last successful physical random access channel (PRACH) preamble transmission and the repetition number for Message 3 transmission.

In one or more embodiments, the number of PUCCH repetitions for HARQ-CK feedback in response to Message 4 may be indicated as a separate RRC parameter. The parameter, "Number of PUCCH repetitions" for PUCCH in response to a PDSCH containing Message 4 may be signaled via MTC-SIB per PRACH CE level as follows:

For PRACH CE level 0 or 1, {1, 2, 4, 8}
For PRACH CE level 2 or 3, {4, 8, 16, 32}

It should be noted that the PRACH CE level is referred to in the context of the random access procedure. For two PRACH CE levels, the set of repetition numbers may be combined, and all four repetition numbers may be separately mapped per the following example ASN.1 code:

determines the number of repetitions for the PUCCH transmission to convey the HARQ-ACK feedback in response to the Message 4 transmission using this defined mapping. The number of repetitions of PUCCH after RRC CONNECTION establishment may be as follows. The RRC parameter "Number of PUCCH repetitions" value range for PUCCH is determined according to:

{1, 2, 4, 8} for CE Mode A, {4, 8, 16, 32} for CE mode B

It should be noted that the RRC parameter refers to a UE-specifically configured parameter, pucch-NumRepetitionCE, via dedicated RRC signaling. The same parameter may be utilized for the number of repetitions for PUCCH carrying HARQ-ACK feedback and for SR transmission.

Figure 4:
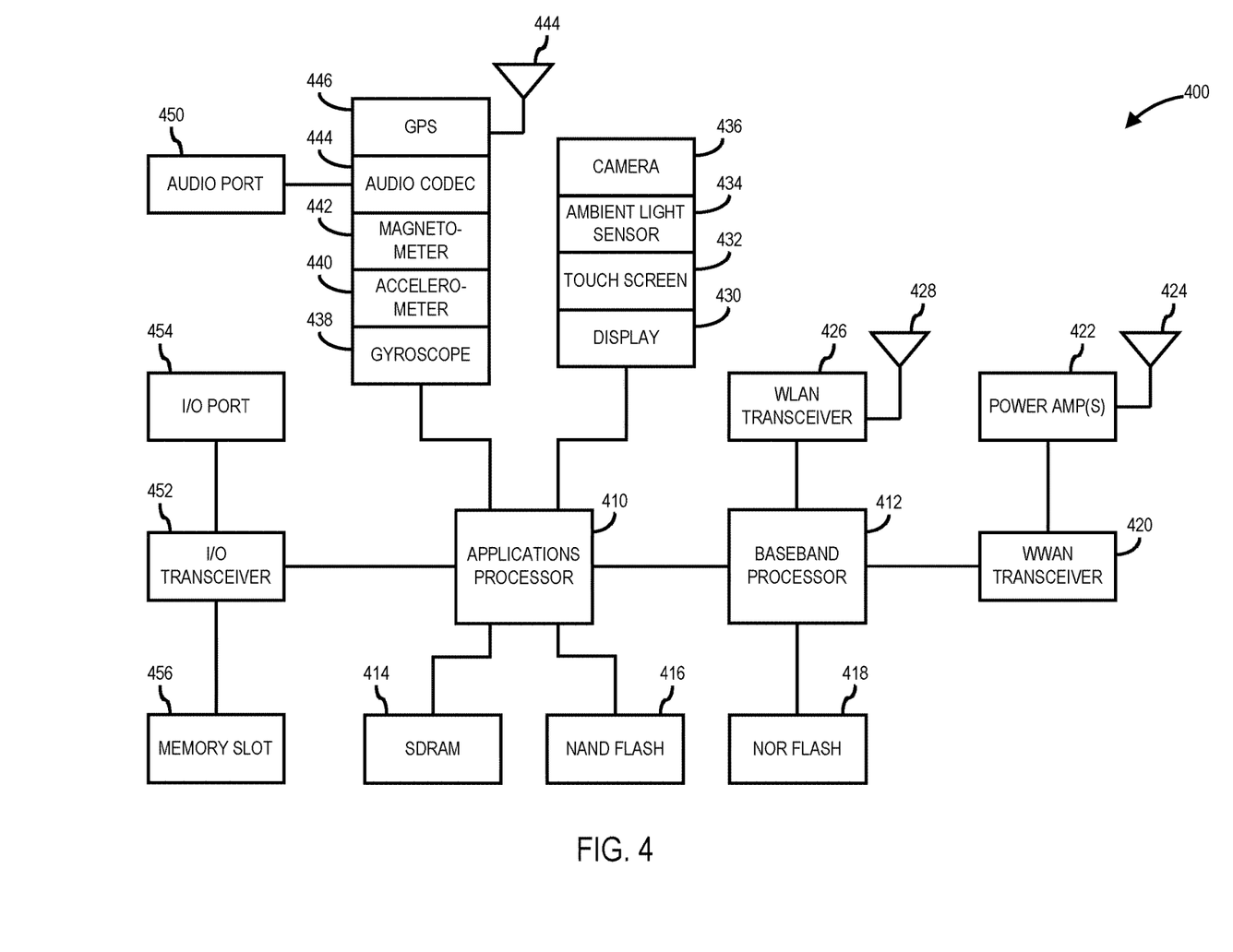
FIG. 4 is a block diagram of an information handling system capable of transmitting or receiving a physical broadcast channel in accordance with one or more embodiments.

Referring now to FIG. 4, a block diagram of an information handling system capable of transmitting or receiving a physical broadcast channel in accordance with one or more embodiments will be discussed. Information handling system 400 of FIG. 4 may tangibly embody any one or more of the network elements described herein with greater or fewer components depending on the hardware specifications of the particular device. In one embodiment, information handling system 400 may tangibly embody an apparatus of a machine-type communication (MTC) user equipment (UE) comprising baseband processing circuitry to establish a radio resource control (RRC) connection with an evolved Node B (eNB), and process a message from the eNB indicating a number of repetitions of physical uplink control channel (PUCCH) transmissions to be used over multiple uplink subframes after the radio resource control connection is established. In another embodiment, information handling system 400 of FIG. 4 may tangibly embody an apparatus of an evolved Node B (eNB) comprising baseband processing circuitry to establish a radio resource control (RRC) connection with a user equipment (UE), the UE comprising a machine-type communication (MTC) device, and generate a message indicating a number of repetitions of physical uplink control channel (PUCCH) transmissions to be used by the UE over multiple uplink subframes after the radio resource control connection is established. Although information handling system 400 represents one example of several types of computing platforms, information handling system 500 may include more or fewer elements and/or different arrangements of elements than shown in FIG. 4, and the scope of the claimed subject matter is not limited in these respects.

```
PUCCH-ConfigCommon-v13xy ::=   SEQUENCE {
    n1PUCCH-AN-InfoList-r13        N1PUCCH-AN-InfoList-r13
        OPTIONAL, -- Need OR
    pucch-NumRepetitionCE-Msg4-Level0-r13   ENUMERATED   {n1,  n2,  n4,  n8}
OPTIONAL, -- Need OR
    pucch-NumRepetitionCE-Msg4-Level1-r13   ENUMERATED   {n1,  n2,  n4,  n8}
OPTIONAL, -- Need OR
    pucch-NumRepetitionCE-Msg4-Level2-r13   ENUMERATED   {n4,  n8,  n16,  n32}
OPTIONAL -- Need OR
    pucch-NumRepetitionCE-Msg4-Level3-r13   ENUMERATED   {n4,  n8,  n16,  n32}
OPTIONAL -- Need OR
}
```

In one or more embodiments, a mapping between the CE level or number of repetitions used for Message 3 transmission and that for PUCCH transmission with HARQ-ACK in response to Message 4 transmission may be defined with an exact configuration of the number of repetitions for each CE level signaled via an MTC SIB. Consequently, eNB 112

In one or more embodiments, information handling system 400 may include an application processor 410 and a baseband processor 412. Application processor 410 may be utilized as a general-purpose processor to run applications and the various subsystems for information handling system 400. Application processor 810 may include a single core or alternatively may include multiple processing cores. One or more of the cores may comprise a digital signal processor or digital signal processing (DSP) core. Furthermore, application processor 410 may include a graphics processor or coprocessor disposed on the same chip, or alternatively a graphics processor coupled to application processor 410 may comprise a separate, discrete graphics chip. Application processor 410 may include on board memory such as cache memory, and further may be coupled to external memory devices such as synchronous dynamic random access memory (SDRAM) 414 for storing and/or executing applications during operation, and NAND flash 416 for storing applications and/or data even when information handling system 400 is powered off. In one or more embodiments, instructions to operate or configure the information handling system 400 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 412 may control the broadband radio functions for information handling system 400. Baseband processor 412 may store code for controlling such broadband radio functions in a NOR flash 418. Baseband processor 412 controls a wireless wide area network (WWAN) transceiver 420 which is used for modulating and/or demodulating broadband network signals, for example for communicating via a 3GPP LTE or LTE-Advanced network or the like.

In general, WWAN transceiver 420 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mm-Wave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 420 couples to one or more power amps 442 respectively coupled to one or more antennas 424 for sending and receiving radio-frequency signals via the WWAN broadband network. The baseband processor 412 also may control a wireless local area network (WLAN) transceiver 426 coupled to one or more suitable antennas 428 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 410 and baseband processor 412, and the scope of the claimed subject matter is not limited in these respects. For example, any one or more of SDRAM 414, NAND flash 416 and/or NOR flash 418 may comprise other types of memory technology such as magnetic memory, chalcogenide memory, phase change memory, or ovonic memory, and the scope of the claimed subject matter is not limited in this respect.

In one or more embodiments, application processor 410 may drive a display 430 for displaying various information or data, and may further receive touch input from a user via a touch screen 432 for example via a finger or a stylus. An ambient light sensor 434 may be utilized to detect an amount of ambient light in which information handling system 400 is operating, for example to control a brightness or contrast value for display 430 as a function of the intensity of ambient light detected by ambient light sensor 434. One or more cameras 436 may be utilized to capture images that are processed by application processor 410 and/or at least temporarily stored in NAND flash 416. Furthermore, application processor may couple to a gyroscope 438, accelerometer 440, magnetometer 442, audio coder/decoder (CODEC) 444, and/or global positioning system (GPS)

controller 446 coupled to an appropriate GPS antenna 448, for detection of various environmental properties including location, movement, and/or orientation of information handling system 400. Alternatively, controller 446 may comprise a Global Navigation Satellite System (GNSS) controller. Audio CODEC 444 may be coupled to one or more audio ports 450 to provide microphone input and speaker outputs either via internal devices and/or via external devices coupled to information handling system via the audio ports 450, for example via a headphone and microphone jack. In addition, application processor 410 may couple to one or more input/output (I/O) transceivers 452 to couple to one or more I/O ports 454 such as a universal serial bus (USB) port, a high-definition multimedia interface (HDMI) port, a serial port, and so on. Furthermore, one or more of the I/O transceivers 452 may couple to one or more memory slots 456 for optional removable memory such as secure digital (SD) card or a subscriber identity module (SIM) card, although the scope of the claimed subject matter is not limited in these respects.

Figure 5:
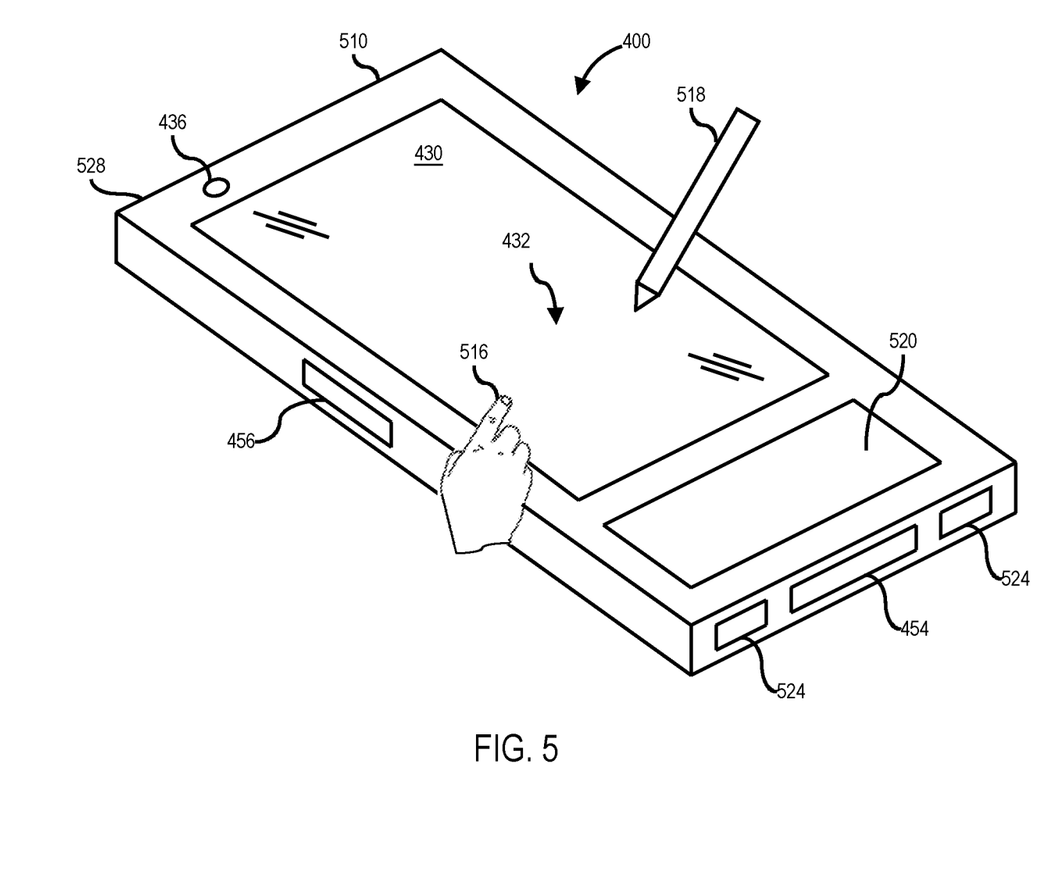
FIG. 5 is an isometric view of an information handling system of FIG. 5 that optionally may include a touch screen in accordance with one or more embodiments.

Referring now to FIG. 5, an isometric view of an information handling system of FIG. 4 that optionally may include a touch screen in accordance with one or more embodiments will be discussed. FIG. 5 shows an example implementation of information handling system 400 of FIG. 4 tangibly embodied as a cellular telephone, smartphone, or tablet type device or the like. The information handling system 400 may comprise a housing 510 having a display 430 which may include a touch screen 432 for receiving tactile input control and commands via a finger 616 of a user and/or a via stylus 518 to control one or more application processors 410. The housing 510 may house one or more components of information handling system 400, for example one or more application processors 410, one or more of SDRAM 414, NAND flash 416, NOR flash 418, baseband processor 412, and/or WWAN transceiver 420. The information handling system 400 further may optionally include a physical actuator area 520 which may comprise a keyboard or buttons for controlling information handling system via one or more buttons or switches. The information handling system 400 may also include a memory port or slot 456 for receiving non-volatile memory such as flash memory, for example in the form of a secure digital (SD) card or a subscriber identity module (SIM) card. Optionally, the information handling system 400 may further include one or more speakers and/or microphones 524 and a connection port 454 for connecting the information handling system 400 to another electronic device, dock, display, battery charger, and so on. In addition, information handling system 400 may include a headphone or speaker jack 528 and one or more cameras 436 on one or more sides of the housing 510. It should be noted that the information handling system 400 of FIG. 5 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 6:
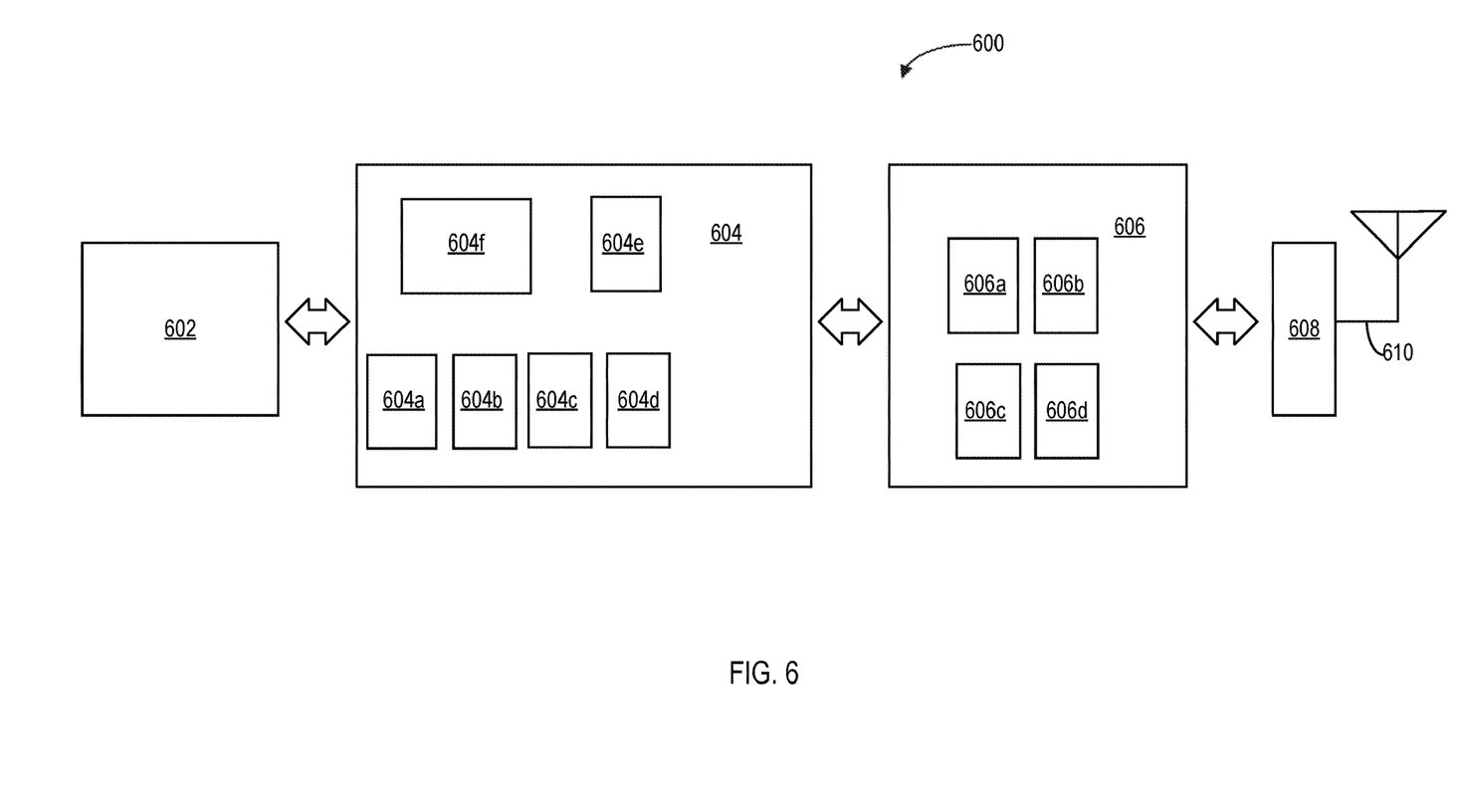
FIG. 6 is a diagram of example components of a wireless device in accordance with one or more embodiments.

Referring now to FIG. 6, example components of a wireless device such as an evolved NodeB (eNB) 112 device or a User Equipment (UE) 110 device in accordance with one or more embodiments will be discussed. In some embodiments, device 600 may include application circuitry 602, baseband circuitry 604, Radio Frequency (RF) circuitry 606, front-end module (FEM) circuitry 608 and one or more antennas 610, coupled together at least as shown. In other embodiments, the above described circuitries may be included in a variety of devices, for example an eNB according to a cloud radio access network (C-RAN) implementation, and the scope of the claimed subject matter is not limited in this respect.

Application circuitry 602 may include one or more application processors. For example, application circuitry 602 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 604 may include circuitry such as, but not limited to, one or more single-core or multi-core processors. Baseband circuitry 604 may include one or more baseband processors and/or control logic to process baseband signals received from a receive signal path of RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or one or more other baseband processors 604d for other existing generations, generations in development or to be developed in the future, for example fifth generation (5G), sixth generation (6G), and so on. Baseband circuitry 604, for example one or more of baseband processors 604a through 604d, may handle various radio control functions that enable communication with one or more radio networks via RF circuitry 606. The radio control functions may include, but are not limited to, signal modulation and/or demodulation, encoding and/or decoding, radio frequency shifting, and so on. In some embodiments, modulation and/or demodulation circuitry of baseband circuitry 604 may include Fast-Fourier Transform (FFT), precoding, and/or constellation mapping and/or demapping functionality. In some embodiments, encoding and/or decoding circuitry of baseband circuitry 604 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 604e of the baseband circuitry 604 may be configured to run elements of the protocol stack for signaling of the PHY, MAC, RLC, PDCP and/or RRC layers. In some embodiments, the baseband circuitry may include one or more audio digital signal processors (DSP) 604f. The one or more audio DSPs 604f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 604 and application circuitry 602 may be implemented together such as, for example, on a system on a chip (SOC).

In some embodiments, baseband circuitry 604 may provide for communication compatible with one or more radio technologies. For example, in some embodiments, baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 704 is configured to support radio communications of more than one wireless protocol may be referred to as multi-mode baseband circuitry.

RF circuitry 606 may enable communication with wireless networks using modulated electromagnetic radiation through a non-solid medium. In various embodiments, RF circuitry 606 may include switches, filters, amplifiers, and so on, to facilitate the communication with the wireless network. RF circuitry 606 may include a receive signal path which may include circuitry to down-convert RF signals received from FEM circuitry 608 and provide baseband signals to baseband circuitry 604. RF circuitry 606 may also include a transmit signal path which may include circuitry to up-convert baseband signals provided by the baseband circuitry 604 and provide RF output signals to FEM circuitry 708 for transmission.

In some embodiments, RF circuitry 606 may include a receive signal path and a transmit signal path. The receive signal path of RF circuitry 606 may include mixer circuitry 606a, amplifier circuitry 606b and filter circuitry 606c. The transmit signal path of RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 706a of the receive signal path may be configured to down-convert RF signals received from FEM circuitry 608 based on the synthesized frequency provided by synthesizer circuitry 606d. Amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to baseband circuitry 604 for further processing. In some embodiments, the output baseband signals may be zero-frequency baseband signals, although this may be optional. In some embodiments, mixer circuitry 606a of the receive signal path may comprise passive mixers, although the scope of the embodiments is not limited in this respect.

In some embodiments, mixer circuitry 606a of the transmit signal path may be configured to up-convert input baseband signals based on the synthesized frequency provided by synthesizer circuitry 606d to generate RF output signals for FEM circuitry 608. The baseband signals may be provided by the baseband circuitry 604 and may be filtered by filter circuitry 606c. Filter circuitry 606c may include a low-pass filter (LPF), although the scope of the embodiments is not limited in this respect.

In some embodiments, mixer circuitry 606a of the receive signal path and the mixer circuitry 606a of the transmit signal path may include two or more mixers and may be arranged for quadrature down conversion and/or up conversion respectively. In some embodiments, mixer circuitry 606a of the receive signal path and the mixer circuitry 606a of the transmit signal path may include two or more mixers and may be arranged for image rejection, for example Hartley image rejection. In some embodiments, mixer circuitry 606a of the receive signal path and the mixer circuitry 606a may be arranged for direct down conversion and/or direct up conversion, respectively. In some embodiments, mixer circuitry 606a of the receive signal path and mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 606 may include analog-to-digital converter (ADC) and digital-to-analog converter (DAC) circuitry, and baseband circuitry 604 may include a digital baseband interface to communicate with RF circuitry 606. In some dual-mode embodiments, separate radio integrated circuit (IC) circuitry may be provided for processing signals for one or more spectra, although the scope of the embodiments is not limited in this respect.

In some embodiments, synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

Synthesizer circuitry 606d may be configured to synthesize an output frequency for use by mixer circuitry 606a of RF circuitry 606 based on a frequency input and a divider control input. In some embodiments, synthesizer circuitry 606d may be a fractional N/N+1 synthesizer.

In some embodiments, frequency input may be provided by a voltage controlled oscillator (VCO), although this may be optional. Divider control input may be provided by either baseband circuitry 604 or applications processor 602 depending on the desired output frequency. In some embodiments, a divider control input (e.g., N) may be determined from a look-up table based on a channel indicated by applications processor 602.

Synthesizer circuitry 606d of RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 606 may include an in-phase and quadrature (IQ) and/or polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by RF circuitry 606 for transmission by one or more of the one or more antennas 610.

In some embodiments, FEM circuitry 608 may include a transmit/receive (TX/RX) switch to switch between transmit mode and receive mode operation. FEM circuitry 608 may include a receive signal path and a transmit signal path. The receive signal path of FEM circuitry 608 may include a low-noise amplifier (LNA) to amplify received RF signals and to provide the amplified received RF signals as an output, for example to RF circuitry 606. The transmit signal path of FEM circuitry 608 may include a power amplifier (PA) to amplify input RF signals, for example provided by RF circuitry 606, and one or more filters to generate RF signals for subsequent transmission, for example by one or more of antennas 610. In some embodiments, device 600 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of a machine-type communication (MTC) user equipment (UE) comprises baseband processing circuitry to establish a radio resource control (RRC) connection with an evolved Node B (eNB), and process a message from the eNB indicating a number of repetitions of physical uplink control channel (PUCCH) transmissions to be used over multiple uplink subframes after the radio resource control connection is established. In example two, the apparatus may include the subject matter of example one or any of the examples described herein, wherein the message is received via dedicated RRC signaling, and the PUCCH transmissions carry hybrid automatic repeat request acknowledgement (HARQ-ACK) feedback in response to a physical downlink shared channel (PDSCH) transmission. In example three, the apparatus may include the subject matter of example one or any of the examples described herein, wherein the message is received via Layer 1 signaling, and the PUCCH transmissions carry hybrid automatic repeat request acknowledgement (HARQ-ACK) feedback in response to a physical downlink shared channel (PDSCH) transmission. In example four, the apparatus may include the subject matter of example three or any of the examples described herein, wherein a limited number of bits is used to indicate the number of PUCCH repetitions from a set of possible values received via dedicated RRC signaling or via common RRC signaling. In example five, the apparatus may include the subject matter of example one or any of the examples described herein, wherein the message is received via dedicated RRC signaling, and the PUCCH transmissions carry scheduling request (SR) information. In example six, the apparatus may include the subject matter of example five or any of the examples described herein, wherein the message is received via dedicated RRC signaling as part of an SR configuration. In example seven, the apparatus may include the subject matter of example one or any of the examples described herein, wherein the PUCCH transmissions carry hybrid automatic repeat request acknowledgement (HARQ-ACK) feedback in response to Message 4. In example eight, the apparatus may include the subject matter of example seven or any of the examples described herein, wherein message is received via Layer 1 signaling. In example nine, the apparatus may include the subject matter of example eight or any of the examples described herein, wherein the Layer 1 signaling is carried in downlink control information (DCI) of an MTC PDCCH (M-PDCCH) used for Message 4. In example ten, the apparatus may include the subject matter of example eight or any of the examples described herein, wherein the M-PDCCH is conveyed in Common Search Space or in UE-specific Search Space if the UE-specific Search Space is configured to the UE as part of a Random Access Response (RAR) transmission. In example eleven, the apparatus may include the subject matter of example eight or any of the examples described herein, wherein the DCI indicates the number of PUCCH repetitions out of a set of values configured via MTC system information block (SIB) signaling or from a set of values derived based at least in part on a mapping from a repetition number used for Message 3 transmission. In example twelve, the apparatus may include the subject matter of example seven or any of the examples described herein, wherein the number of PUCCH repetitions is conveyed using a mapping defined between a number of repetitions used for Message 3 transmission and a number of repetitions used for transmission of PUCCH for HARQ-ACK feedback in response to Message 4. In example thirteen, the apparatus may include the subject matter of example seven or any of the examples described herein, wherein a number of repetitions of PUCCH to carry HARQ-ACK feedback in response to a PDSCH transmission is identical to the number of repetitions of PUCCH to carry HARQ-ACK feedback in response to Message 4 until a valid RRC configuration with a new PUCCH repetition number is received from the eNB.

In example fourteen, an apparatus of an evolved Node B (eNB) comprises baseband processing circuitry to establish a radio resource control (RRC) connection with a user equipment (UE), the UE comprising a machine-type communication (MTC) device, and generate a message indicating a number of repetitions of physical uplink control channel (PUCCH) transmissions to be used by the UE over multiple uplink subframes after the radio resource control connection is established. In example fifteen, the apparatus may include the subject matter of example fourteen or any of the examples described herein, wherein the message is to be transmitted via dedicated RRC signaling for PUCCH transmissions that carry hybrid automatic repeat request acknowledgement (HARQ-ACK) feedback in response to a physical downlink shared channel (PDSCH) transmission. In example sixteen, the apparatus may include the subject matter of example fourteen or any of the examples described herein, wherein the message is to be transmitted via Layer 1 signaling for PUCCH transmissions that carry hybrid automatic repeat request acknowledgement (HARQ-ACK) feedback in response to a physical downlink shared channel (PDSCH) transmission. In example seventeen, the apparatus may include the subject matter of example sixteen or any of the examples described herein, wherein the message is to be transmitted via dedicated RRC signaling or via common RRC signaling, wherein the message comprises a limited number of bits is to indicate the number of PUCCH repetitions from a set of possible values. In example eighteen, the apparatus may include the subject matter of example fourteen or any of the examples described herein, wherein the message is to be transmitted via dedicated RRC signaling for PUCCH transmissions that carry scheduling request (SR) information. In example nineteen, the apparatus may include the subject matter of example eighteen or any of the examples described herein, wherein the message is to be transmitted via dedicated RRC signaling as part of an SR configuration. In example twenty, the apparatus may include the subject matter of example fourteen or any of the examples described herein, wherein the number of repetitions is for PUCCH transmissions that carry hybrid automatic repeat request acknowledgement (HARQ-ACK) feedback in response to Message 4. In example twenty-one, the apparatus may include the subject matter of example twenty or any of the examples described herein—wherein message is to be transmitted via Layer 1 signaling. In example twenty-two, the apparatus may include the subject matter of example twenty-one or any of the examples described herein, wherein the Layer 1 signaling is carried in downlink control information (DCI) of an MTC PDCCH (M-PDCCH) used for Message 4.

In example twenty-three, one or more computer-readable media have instructions stored thereon that, if executed by a user equipment (UE), result in establishing a radio resource control (RRC) connection with an evolved Node B (eNB), and processing a message from the eNB indicating a number of repetitions of physical uplink control channel (PUCCH) transmissions to be used over multiple uplink subframes after the radio resource control connection is established. In example twenty-four, the one or more computer-readable media may have instructions stored thereon that, if executed by a user equipment (UE), result in the subject matter of example twenty-three or any of the examples described herein, wherein the message is received via dedicated RRC signaling, and the PUCCH transmissions carry hybrid automatic repeat request acknowledgement (HARQ-ACK) feedback in response to a physical downlink shared channel (PDSCH) transmission. In example twenty-five, the one or more computer-readable media may have instructions stored thereon that, if executed by a user equipment (UE), result in the subject matter of example twenty-three or any of the examples described herein, wherein the message is received via Layer 1 signaling, and the PUCCH transmissions carry hybrid automatic repeat request acknowledgement (HARQ-ACK) feedback in response to a physical downlink shared channel (PDSCH) transmission. In example twenty-six, the one or more computer-readable media may have instructions stored thereon that, if executed by a user equipment (UE), result in the subject matter of example twenty-five or any of the examples described herein, wherein a limited number of bits is used to indicate the number of PUCCH repetitions from a set of possible values received via dedicated RRC signaling or via common RRC signaling. In example twenty-seven, the one or more computer-readable media may have instructions stored thereon that, if executed by a user equipment (UE), result in the subject matter of example twenty-three or any of the examples described herein, wherein the message is received via dedicated RRC signaling, and the PUCCH transmissions carry scheduling request (SR) information. In example twenty-eight, the one or more computer-readable media may have instructions stored thereon that, if executed by a user equipment (UE), result in the subject matter of example twenty-seven or any of the examples described herein, wherein the message is received via dedicated RRC signaling as part of an SR configuration. In example twenty-nine, the one or more computer-readable media may have instructions stored thereon that, if executed by a user equipment (UE), result in the subject matter of example twenty-three or any of the examples described herein, wherein the PUCCH transmissions carry hybrid automatic repeat request acknowledgement (HARQ-ACK) feedback in response to Message 4. In example thirty, the one or more computer-readable media may have instructions stored thereon that, if executed by a user equipment (UE), result in the subject matter of example twenty-nine or any of the examples described herein, wherein message is received via Layer 1 signaling.

In example thirty-one, an apparatus of a machine-type communication (MTC) user equipment (UE), comprises means for establishing a radio resource control (RRC) connection with an evolved Node B (eNB), and means for processing a message from the eNB indicating a number of repetitions of physical uplink control channel (PUCCH) transmissions to be used over multiple uplink subframes after the radio resource control connection is established. In example thirty-two, the apparatus may include the subject matter of example thirty-one or any of the examples described herein, wherein the message is received via dedicated RRC signaling, and the PUCCH transmissions carry hybrid automatic repeat request acknowledgement (HARQ-ACK) feedback in response to a physical downlink shared channel (PDSCH) transmission. In example thirty-three, the apparatus may include the subject matter of example thirty-one or any of the examples described herein, wherein the message is received via Layer 1 signaling, and the PUCCH transmissions carry hybrid automatic repeat request acknowledgement (HARQ-ACK) feedback in response to a physical downlink shared channel (PDSCH) transmission. In example thirty-four, the apparatus may include the subject matter of example thirty-three or any of the examples described herein, wherein a limited number of bits is used to indicate the number of PUCCH repetitions from a set of possible values received via dedicated RRC signaling or via common RRC signaling. In example thirty-five, the apparatus may include the subject matter of example thirty-one or any of the examples described herein, wherein the message is received via dedicated RRC signaling, and the PUCCH transmissions carry scheduling request (SR) information. In example thirty-six, the apparatus may include the subject matter of example thirty-five or any of the examples described herein, wherein the message is received via dedicated RRC signaling as part of an SR configuration. In example thirty-seven, the apparatus may include the subject matter of example thirty-one or any of the examples described herein, wherein the PUCCH transmissions carry hybrid automatic repeat request acknowledgement (HARQ-ACK) feedback in response to Message 4. In example thirty-eight, the apparatus may include the subject matter of example thirty-seven or any of the examples described herein, wherein message is received via Layer 1 signaling. In another example, a number of PUCCH repetitions is conveyed using a mapping defined between a coverage enhancement level defined by a Physical Random Access Channel (PRACH) repetition level and a number of repetitions used for transmission of PUCCH for HARQ-ACK feedback in response to Message 4.

Although the claimed subject matter has been described with a certain degree of particularity, it should be recognized that elements thereof may be altered by persons skilled in the art without departing from the spirit and/or scope of claimed subject matter. It is believed that the subject matter pertaining to determination of the number of physical uplink control channel repetitions for machine type communications and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a machine-type communication (MTC) user equipment (UE) comprising baseband processing circuitry to:
   transmit a physical uplink control channel (PUCCH) carrying hybrid automatic repeat request acknowledgement (HARQ-ACK) feedback in response to a message 4 (msg4) of a random access procedure received from a base station; and
   receive, after msg4 and prior to transmitting the HARQ-ACK feedback on the PUCCH, a radio resource control (RRC) message from the base station indicating a number of repetitions of the PUCCH transmissions to be used over multiple uplink subframes in response to the msg4 and after a RRC connection is established with the base station via the random access procedure, wherein the number of repetitions of the PUCCH transmissions is based on a mapping between a physical random access channel (PRACH) coverage enhancement level and one repetition number from a set of multiple different repetition numbers.

2. The apparatus as claimed in claim 1, wherein the msg4 is a physical downlink shared channel (PDSCH) transmission.

3. The apparatus as claimed in claim 1, wherein a limited number of bits is used to indicate the number of PUCCH repetitions from a set of possible values.

4. The apparatus as claimed in claim 1, wherein the PUCCH transmissions carry scheduling request (SR) information.

5. The apparatus as claimed in claim 4, wherein the RRC message is received via dedicated RRC signaling.

6. The apparatus as claimed in claim 1, wherein a number of repetitions of PUCCH to carry HARQ-ACK feedback in response to a PDSCH transmission is identical to the number of repetitions of PUCCH to carry HARQ-ACK feedback in response to Message 4 until a valid RRC configuration with a new PUCCH repetition number is received from the base station.

7. The apparatus as claimed in claim 1, wherein each coverage enhancement level from a set of coverage enhancement levels is mapped to a different repetition number.

8. An apparatus of a base station comprising baseband processing circuitry to:
   receive a physical uplink control channel (PUCCH) carrying hybrid automatic repeat request acknowledgement (HARQ-ACK) feedback from a machine-type communication (MTC) user equipment (UE) in response to a message 4 (msg4) of a random access procedure; and
   transmit, after msg4 and prior to receiving the HARQ-ACK feedback on the PUCCH, a radio resource control (RRC) message indicating a number of repetitions of the PUCCH transmissions to be used by the UE over multiple uplink subframes in response to the msg4 and after a RRC connection is established via the random access procedure, wherein the number of repetitions of the PUCCH transmissions is based on a mapping between a physical random access channel (PRACH) coverage enhancement level and one repetition number from a set of multiple different repetition numbers.

9. The apparatus as claimed in claim 8, wherein the message 4 is a physical downlink shared channel (PDSCH) transmission.

10. The apparatus as claimed in claim 8, wherein a limited number of bits is to indicate the number of PUCCH repetitions from a set of possible values.

11. The apparatus as claimed in claim 8, wherein PUCCH transmissions carry scheduling request (SR) information.

12. The apparatus as claimed in claim 11, wherein the RRC message is transmitted via dedicated RRC signaling.

13. The apparatus as claimed in claim 8, wherein a number of repetitions of PUCCH to carry HARQ-ACK feedback in response to a PDSCH transmission is identical to the number of repetitions of PUCCH to carry HARQ-ACK feedback in response to Message 4 until a valid RRC configuration with a new PUCCH repetition number is provided to the UE by the base station.

14. One or more non-transitory computer-readable media having instructions stored thereon that, if executed by a user equipment (UE), result in:
   transmitting a physical uplink control channel (PUCCH) carrying hybrid automatic repeat request acknowledgement (HARQ-ACK) feedback in response to a message 4 (msg4) of a random access procedure received from a base station; and
   receiving, after msg4 and prior to transmitting the HARQ-ACK feedback on the PUCCH, a radio resource control (RRC) message from the baser station indicating a number of repetitions of the PUCCH transmissions to be used over multiple uplink subframes in response to the msg4 and after a RRC connection is established via the random access procedure, wherein the number of repetitions of the PUCCH transmissions is based on a mapping between a physical random access channel (PRACH) coverage enhancement level and one repetition number from a set of multiple different repetition numbers.

15. The one or more non-transitory computer-readable media as claimed in claim 14, wherein the msg4 is a physical downlink shared channel (PDSCH) transmission.

16. The one or more non-transitory computer-readable media as claimed in claim 14, wherein a limited number of bits is used to indicate the number of PUCCH repetitions from a set of possible values.

17. The one or more non-transitory computer-readable media as claimed in claim 14, wherein the PUCCH transmissions carry scheduling request (SR) information.

18. The one or more non-transitory computer-readable media as claimed in claim 14, wherein a number of repetitions of PUCCH to carry HARQ-ACK feedback in response to a PDSCH transmission is identical to the number of repetitions of PUCCH to carry HARQ-ACK feedback in response to Message 4 until a valid RRC configuration with a new PUCCH repetition number is received from the base station.

* * * * *

UNITED STATES PATENT AND TRADEMARK OFFICE
CERTIFICATE OF CORRECTION

PATENT NO. : 11,350,391 B2
APPLICATION NO. : 15/749757
DATED : May 31, 2022
INVENTOR(S) : Chatterjee It is certified that error appears in the above-identified patent and that said Letters Patent is hereby corrected as shown below:

In the Claims

Claim 14, Column 18, Line 51:
"(RRC) message from the baser station indicating a" should read "(RRC) message from the base station indicating a"

Signed and Sealed this
Fourth Day of October, 2022

Katherine Kelly Vidal
Director of the United States Patent and Trademark Office